United States Patent [19]

Bell et al.

[11] Patent Number: 5,797,056
[45] Date of Patent: *Aug. 18, 1998

[54] FILM CARTRIDGE CANISTER WITH SOUND DEVICE STORAGE

[75] Inventors: Cynthia S. Bell, Webster; James Gresko, Rochester; William C. Archie, Jr., Pittsford, all of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 753,666

[22] Filed: Nov. 27, 1996

[51] Int. Cl.$^6$ .................. C03B 17/26; B65D 85/30
[52] U.S. Cl. ........................ 396/512; 206/307.1
[58] Field of Search ................... 396/312, 511, 396/512; 206/307.1, 316.2, 389, 454, 407; 428/516, 36.92; 525/240, 222; 220/239

[56] References Cited

U.S. PATENT DOCUMENTS

| | | | |
|---|---|---|---|
| 4,406,385 | 9/1983 | Pribyl | 224/252 |
| 4,620,579 | 11/1986 | Lowe et al. | 206/523 |
| 4,801,011 | 1/1989 | Desdoigts et al. | 206/316 |
| 5,128,700 | 7/1992 | Inoue et al. | 396/312 |
| 5,139,165 | 8/1992 | Hara | 220/339 |
| 5,370,227 | 12/1994 | Shibazaki et al. | 206/391 |
| 5,574,519 | 11/1996 | Manico et al. | 396/429 |

*Primary Examiner*—Safet Metjahic
*Assistant Examiner*—Nicholas J. Tuccillo
*Attorney, Agent, or Firm*—Francis H. Boos, Jr.

[57] ABSTRACT

A photographic film cartridge canister provided with an integrally formed, separate compartment for storage of a sound device, such as an IC sound card, used to record sound in association with still images captured on the photographic film stored in the canister.

12 Claims, 3 Drawing Sheets

FILM CARTRIDGE CANISTER WITH SOUND DEVICE STORAGE

FIELD OF THE INVENTION

The invention relates generally to the field of photography, and in particular to photographic film cartridge canisters with provision for storage of sound media.

BACKGROUND OF THE INVENTION

Photographic still image cameras have been proposed that have provision for recording sound in association with capturing of a still image on photographic film. Examples of such cameras are disclosed in U.S. Pats. 5,128,700 and 5,387,955. In the '955 patent, sound, i.e. audio information, is recorded into a solid state memory integral to a camera remote control apparatus. In the '700 patent, the sound is recorded into a removable solid state memory integrated circuit card as seen in FIG. 1. In this arrangement, a camera body 1 is provided with a recording/playback mode changeover switch to allow selection of sound recording via a microphone (not shown) on the front of the camera or playback of the recorded sound via a speaker 6 mounted in the camera back. A sound card 8 is insertable into a sound card interface holder 9 mounted on the side of the camera body. An ejecting lever 10 is provided for opening the holder and releasing the card. The holder 9 is provided with suitable interconnections to electronic circuits in the camera. Sound is initially digitally recorded in memory in the camera and, at an appropriate time, is transferred from the camera memory to sound card 8. The sound card can then be removed and is available for playback of the sound through a suitable playback device when viewing the associated still image prints.

In the systems described in the above patents, the user must pair up each roll of film with its audio storage medium. This can be problematic in many instances, such as when multiple rolls of film have been exposed at an event or when the user habitually accumulates a number of rolls of exposed film before sending the film to the photofinisher for processing. The association of the correct roll of film with the correct audio storage medium is awkward and unwieldy in practice. Another problem exists with some sound storage media, such as the sound card 8 of FIG. 1. In consumers' hands, the cards can be subject to damage by static and must be protected from excessive wear of the electrical interface contact pads.

It is well known to deliver rolls of photographic film in a container. These containers may aid the keeping properties of the film by being waterproof and/or light-tight. Other container are known that hold multiple rolls of film and that protect the film from x-ray screening at airports. Recently, a new style of photographic film cartridge has been introduced that deals with filing a storage of processed rolls of film, i.e. negatives that are returned to the use in the original film cartridge.

It is not known that there has been any disclosure dealing with the problem of transporting film in correct association sound storage media from the camera user to the photofinisher and return. The present invention solves this problem in a manner that preserves the water- and light-tightness advantages of current film cartridge containers.

SUMMARY OF THE INVENTION

The foregoing described problems are solved by the present invention in which there is provided an improved canister for a photographic film cartridge, the canister having a cartridge containing body and a cap to form a water- and light-tight seal with the body, wherein the improvement comprises a device retaining portion integrally formed with the canister body and adapted to receive a sound recording device capable of bearing sound recorded in association with still images captured on photographic film in the film cartridge. In one preferred embodiment of the invention, the improved film cartridge canister is provided with a compartment integrally formed on the exterior of the body and the cap is provided with a sealing lip shaped to correspond to the body and the exterior compartment. In another preferred embodiment, the body has an exterior wall that is larger than that necessary to contain the film cartridge and a partition is provided to form an interior compartment for retention of the sound device. In yet another preferred embodiment, the cartridge containing body wall is provided interiorly with opposed slots that define a device retaining portion therebetween, the slots being sized to freely engage edges of the sound device inserted therebetween.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
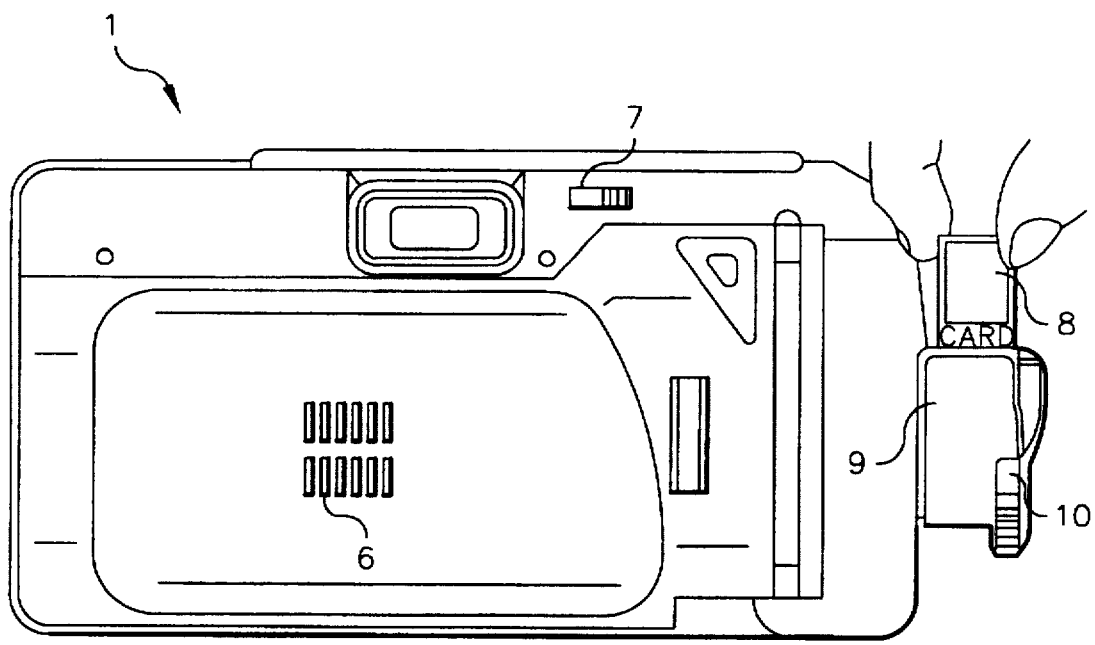
FIG. 1 is a schematic of a prior art camera showing the provision of a sound recording device on the side of the camera.
Figure 2:
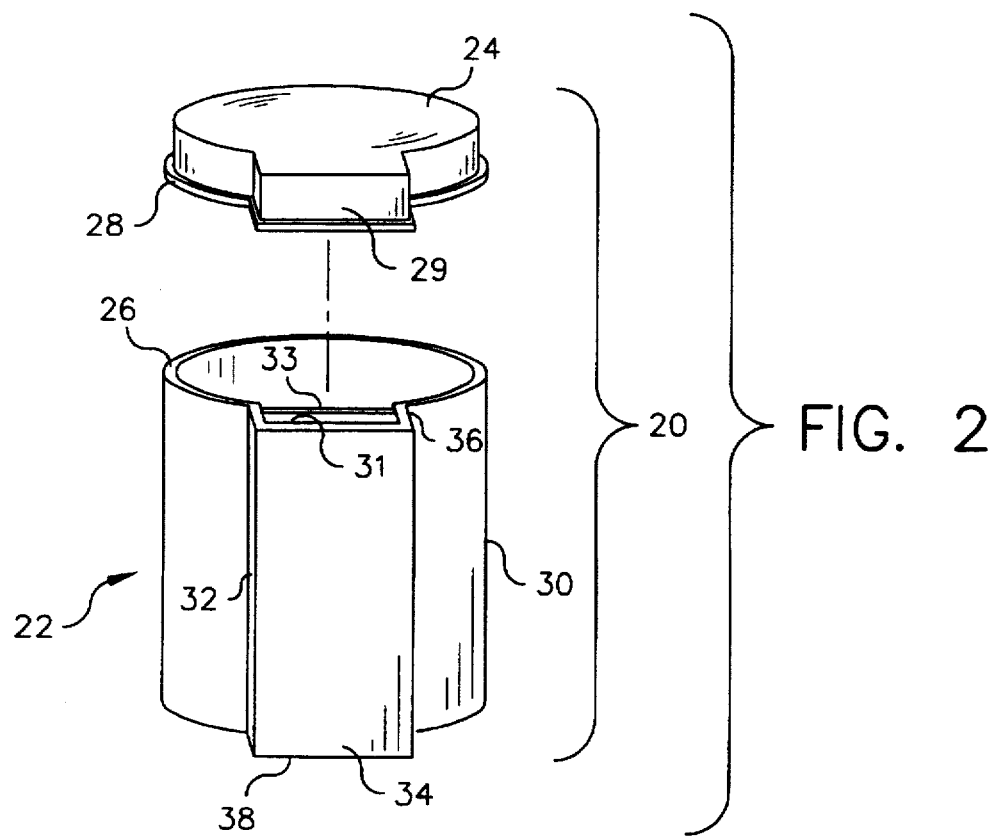
FIG. 2 is a schematic perspective illustration of a first embodiment of the present invention.

Referring to FIG. 2, there is shown one embodiment of an improved canister 20 for a photographic film cartridge (not shown), wherein the canister 20 comprises a canister body 22 and a cap 24, the body and cap having mating lips 26,28 that form a water- and light-tight seal in known manner when the cap is mated to the body. The canister body defines a first, main compartment 30 shaped to receive and hold the film cartridge. The canister body is provided with a sound device retaining portion in the form of a second compartment 31 integrally formed on the exterior of the main canister body and defined by canister wall segment 33, extension side walls 32,34,36 and a bottom wall 38. This second compartment 31 is shaped so as to receive a sound recording device, such as a sound card, of the type capable of bearing sound information recorded in association with the capture of still images on the photographic film contained the cartridge stored in the first compartment 30 of the canister body. Typically, a sound card is generally planar in form and, consequently, the side wall segment 33 of the main canister body and the side wall 38 of the second component are preferably formed in parallel planar fashion to appropriately accommodate the sound device. As can be seen in the drawing, cap 24 has an extended portion 29 which is shaped to encompass the added second compartment thereby providing a water- and light-tight seal for both the film cartridge compartment and the sound device compartment.

Figure 3:
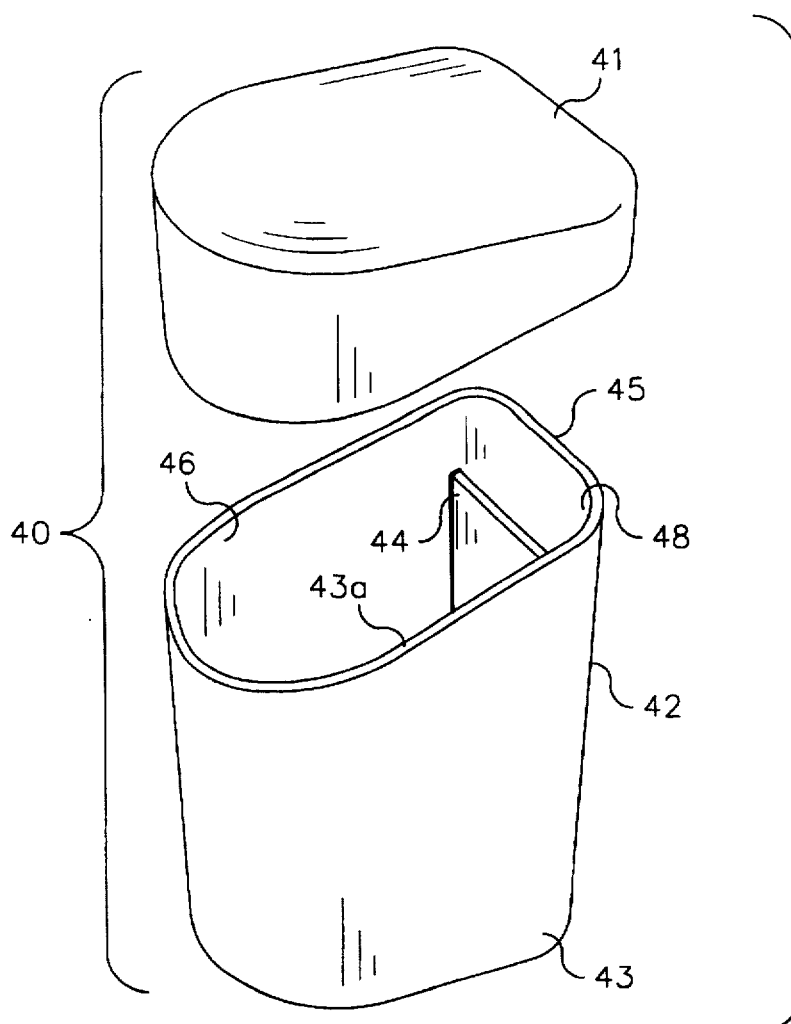
FIGS. 3–6 are schematic perspective illustrations of alternative embodiments of the present invention.
Figure 4:
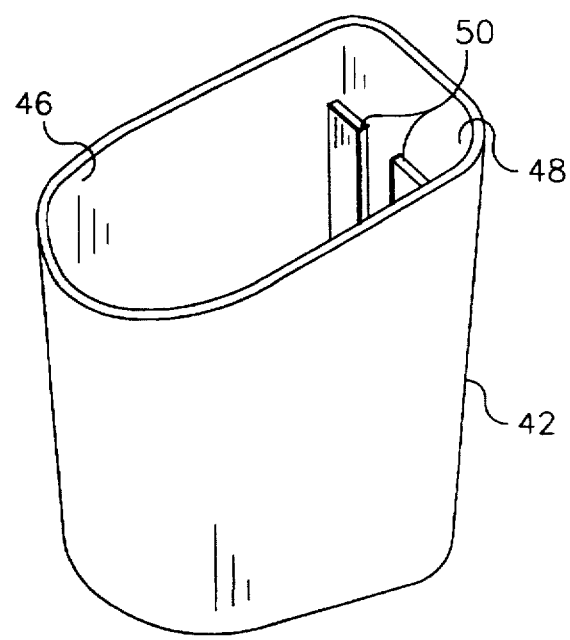

Referring to FIG. 3, an alternative embodiment of the invention is shown in which the canister 40 is provided with a cap 41 and a canister body 42 in which the exterior wall 43 of the body is smoothly formed, preferably monotonically, such as to form, in cross section, a generally oval, e.g. egg shaped, wall configuration truncated at one end by a generally planar exterior wall segment 45. In the embodiment of FIG. 3, the canister body 42 is provided with a sloping upper lip surface 43a creating a varying wall height. The interior of the canister body is provided with a partition in the form of a divider wall 44 parallel to the planar exterior wall portion 45. The divider wall may be integrally formed within the canister body. Divider wall 44 separates the main cartridge containing compartment 46 on one side from the device retaining portion comprising a separate compartment 48 formed between the wall 44 and the planar exterior wall portion 45 and which is adapted to receive the sound recording device associated with a film cartridge stored in the first compartment. The sloped lip surface 43a provides an increasing wall height extending from the film cartridge compartment 46 to the sound device compartment 48 thereby providing easy access to a film cartridge that is significantly shorter than the sound device while at the same time properly protecting the sound device. It will be appreciated that the slope may be reversed for those situations in which the sound device is shorter than the film cartridge. In FIG. 4, a modified form of the canister of FIG. 3 is shown with a modified partition in which the solid divider wall 44 of the canister body 42 in FIG. 3 is replaced by a pair of integrally formed flanges 50 extending inwardly of the canister sufficiently to capture a sound recording device with the second compartment 48.

Figure 5:
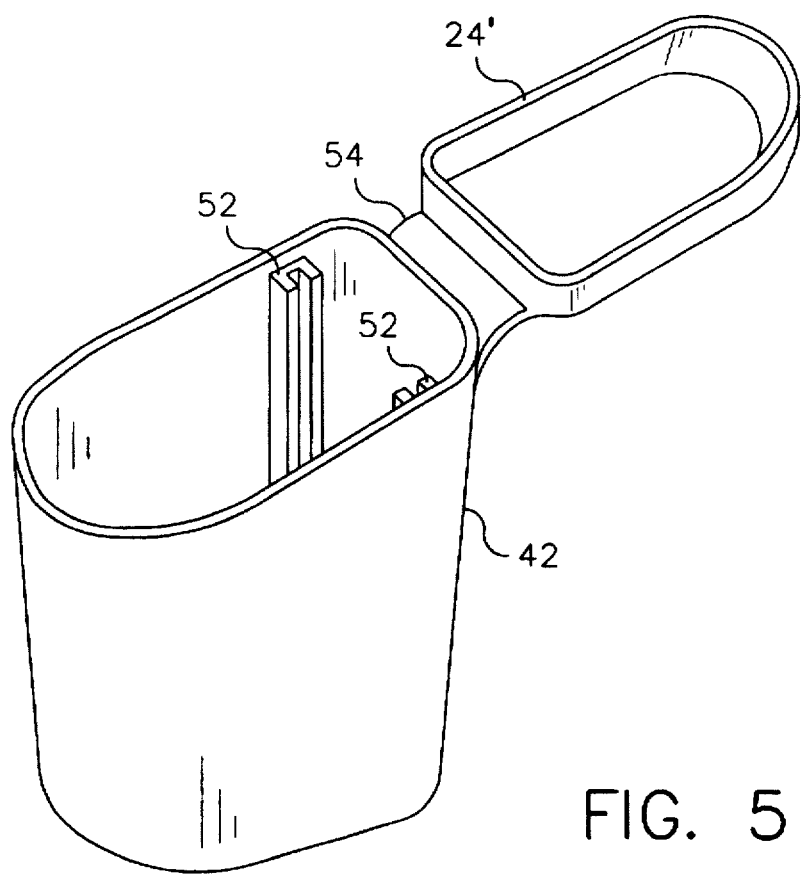
Figure 6:
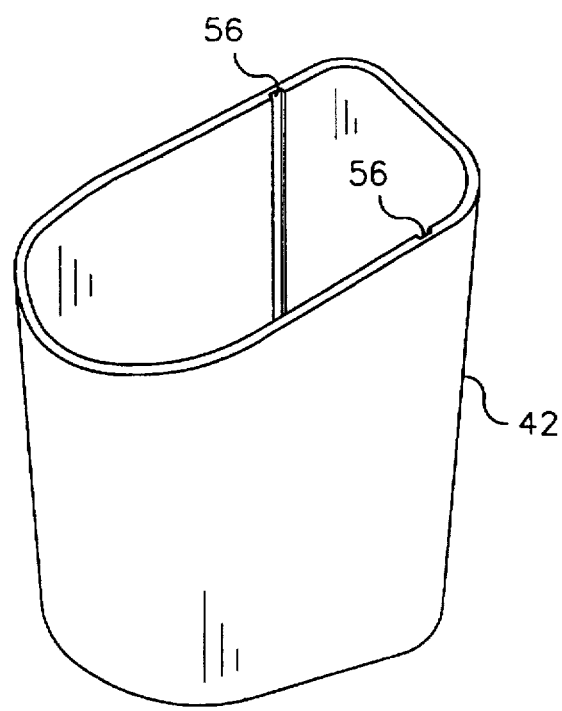

FIG. 5 shows another embodiment of the invention in which the sound device retaining portion is defined by the space between opposing slotted flanges 52 formed on the interior of the canister body side walls, the dimensions of the slots being such as to freely engage and retain the edges of a sound card inserted therein. Cap 24', shaped to conform to the outline of canister body 42, is attached to the canister body by means of a flexible hinge 54. In FIG. 6, the device retaining portion is defined by the space between opposing slots 56 formed directly on the interior surface of the canister body side walls, the slots being sized to freely engage the edges of the sound card.

The invention has been described with reference to one or more preferred embodiments. However, it will be appreciated that variations and modifications can be effected by a person of ordinary skill in the art without departing from the scope of the invention. PARTS LIST 1 camera body 6 speaker 8 sound card 9 sound card holder 10 ejecting lever 20 film cartridge canister 22 canister body 24 cap 26 canister body lip 28 cap lip 29 cap extension portion 30 canister main compartment (for film cartridge) 31 canister second compartment (for sound device) 32,34,36 second compartment side walls 33 canister side wall portion 38 second compartment bottom wall 40 canister 41 cap 42 canister body 44 interior partition wall 46 cartridge containing compartment 48 sound device containing compartment 50 partition flanges 52 slotted sound card retaining flanges 54 cap hinge 56 sound card retaining slots

What is claimed is:

1. An improved photographic film cartridge canister of the type having a cartridge containing thin-walled body and a cap forming a seal with the body, the improvement comprising:

a sound card retaining compartment integrally formed with the canister body and shaped to conform to and receive a planar sound recording card capable of bearing sound recorded in associated with images captured on photographic film in the film cartridge.

2. The improved film cartridge canister of claim 1, wherein said sound card retaining portion comprises a compartment formed on the exterior of the cartridge containing body and said cap being provided with a sealing lip shaped to correspond to said body and said exterior compartment such as to sealably enclose both of said compartments when mated to the canister body.

3. The improved film cartridge canister of claim 2 wherein said compartment is integrally formed on the exterior of the cartridge containing body.

4. The improved film cartridge canister of claim 1 in which said body is provided with an exterior wall of varying height and an interior that is larger than that necessary to contain the film cartridge alone, and the body includes an interior partition within the body to define, on one side, a cartridge containing compartment and, on the other side, said sound card retaining compartment in the form of an interior compartment for retaining said sound card.

5. The improved film cartridge canister of claim 4 wherein the exterior wall forms a generally oval wall configuration which is truncated at one end by a generally planar wall segment and the interior partition comprises a divider wall spaced from said exterior planar wall segment to form said interior sound card retaining compartment.

6. The improved film cartridge canister of claim 5 wherein said interior partition comprises a planar divider wall spaced from and parallel to said exterior planar wall segment.

7. The improved film cartridge canister of claim 4 wherein the exterior wall forms a generally oval wall configuration which is truncated at one end by a generally planar wall segment and the interior partition comprises a pair of flanges integrally formed with said canister exterior wall, said flanges being spaced from said planar wall segment and extending inwardly sufficiently to capture said sound card in said sound card compartment.

8. The improved film cartridge canister of claim 1 in which the cartridge containing body is provided with an exterior wall of varying height and an interior that is larger than that necessary to contain the film cartridge, and said wall includes opposing slotted flanges formed on the interior of the wall, said opposing slotted flanges defining said device retaining portion therebetween, the dimensions of the slots being such as to freely engage and retain the edges of a sound card inserted therein.

9. The improved film cartridge canister of claim 1 in which the cartridge containing body is provided with an exterior wall of varying height and an interior that is larger than that necessary to contain the film cartridge, and said wall includes opposing slots formed on the interior surface of the wall, said opposing slots defining said device retaining portion therebetween, the dimensions of the slots being such as to freely engage and retain the edges of a sound card inserted therein.

10. The improved film cartridge canister of claim 4, 8 or 9 in which the wall height increases from said cartridge compartment to said device retaining portion to provide easy access to a film cartridge that is shorter than said sound device while properly protecting said sound device.

11. The improved film cartridge canister of claim 4, 8 or 9 in which the cap has a side height that varies inversely of the canister wall height to mate with the canister body such that the mated canister and cap is of uniform height for easier stacking.

12. The improved film cartridge canister of any one of claims 4–9 in which the cap is attached to the canister body by a hinge.

* * * * *